United States Patent [19]
Adsit et al.

[11] Patent Number: 5,459,669
[45] Date of Patent: Oct. 17, 1995

[54] CONTROL SYSTEM AND METHOD FOR SPACECRAFT ATTITUDE CONTROL

[75] Inventors: Rhys Adsit, Milpitas; Tung Liu, Union City; Fred N. T. Chan, Atherton, all of Calif.; Charles J. Weyandt, Jr., Yardley, Pa.; Scott Tilley, Belmont; Michel Bayloca, Menlo Park, both of Calif.

[73] Assignee: Space Systems/Loral, Inc., Palo Alto, Calif.

[21] Appl. No.: 195,393

[22] Filed: Feb. 14, 1994

[51] Int. Cl.⁶ .................................................. B64G 1/10
[52] U.S. Cl. ..................... 364/459; 364/434; 244/169
[58] Field of Search ........................... 364/433, 434, 364/459; 244/164, 165, 166, 169, 170, 171, 172; 318/582, 584, 585, 586

[56] References Cited

U.S. PATENT DOCUMENTS

| | | | |
|---|---|---|---|
| 3,866,025 | 2/1975 | Cavanagh | 235/150.2 |
| 3,937,423 | 2/1976 | Johansen | 244/3.22 |
| 3,984,071 | 10/1976 | Fleming | 244/169 |
| 4,174,819 | 11/1979 | Bruderle et al. | 244/169 |
| 4,288,051 | 9/1981 | Göschel | 244/164 |
| 4,504,032 | 3/1985 | Phillips et al. | 244/170 |
| 4,521,855 | 6/1985 | Lehner et al. | 364/434 |
| 4,537,375 | 8/1985 | Chan | 244/171 |
| 4,599,697 | 7/1986 | Chan et al. | 364/434 |
| 4,725,024 | 2/1988 | Vorlicek | 244/164 |
| 4,758,957 | 7/1988 | Hubert et al. | 364/434 |
| 4,767,084 | 8/1988 | Chan et al. | 244/164 |
| 4,916,622 | 4/1990 | Raman et al. | 364/459 |
| 4,931,942 | 6/1990 | Garg et al. | 364/459 |
| 4,958,788 | 9/1990 | Namera et al. | 244/169 |
| 5,012,992 | 5/1991 | Salvatore | 244/165 |
| 5,222,023 | 6/1993 | Liu et al. | 364/434 |
| 5,308,024 | 5/1994 | Stetson, Jr. | 244/165 |

Primary Examiner—Kevin J. Teska
Assistant Examiner—Stephen J. Walder, Jr.
Attorney, Agent, or Firm—Perman & Green

[57] ABSTRACT

Position control methods are described for satellites and spacecraft for controlling transition from thruster control to momentum wheel control in a three-axis stabilized spacecraft. Transition from a high-bandwidth, high-torque thruster-controlled stationkeeping (SK) mode to a low bandwidth, low torque momentum wheel On-Orbit Mode is carried out. Usually a unique threshold entry method to automatically initiate the transition mode at the point with the most favorable dynamics. Also, the disclosed method eliminates the use of nutation in conjunction with a deadbeat thruster sequence to correct the spacecraft attitude to improve pointing performance and significantly shorten the time spent in the transition mode.

5 Claims, 3 Drawing Sheets

CONTROL SYSTEM AND METHOD FOR SPACECRAFT ATTITUDE CONTROL

BACKGROUND OF THE INVENTION

1. Field of the Invention

The present invention relates to position control methods and systems for satellites and spacecraft, and more specifically, to controlling transition from thruster control to momentum wheel control in a three-axis stabilized spacecraft.

2. Description of Background Art

U.S. Pat. No. 5,222,023 issued to Liu et al. on Jun. 22, 1993 and entitled "Compensated Transition For Spacecraft Attitude Control" describes an improved method for transitioning a spacecraft from a thruster controlled, station keeping mode to an operational, on-orbit mode, in which attitude control is maintained using internal momentum wheels. The method first utilizes a thruster compensation technique to supplement the conventional transition mode control system. This compensation uses empirical thruster data to derate thruster efficiency for extremely short pulse durations necessarily used in transition mode operation. Secondly, a three step deadbeat thruster sequence is employed in which a first pulse linearizes spacecraft motion prior to orienting and stopping nutation. This linearization provides improved accuracy in computing and shortens the waiting time for subsequent thruster firings.

U.S. Pat. No. 4,931,942 issued to Garg et al. on Jun. 5, 1990 and entitled "Transition Control System For Spacecraft Attitude Control", describes a method for controlling nutational motion during spacecraft transition from a station-keeping mode to an on-orbit mode using a feedback control system to control multiple thruster pulse firings. Although the problems of thruster non-idealities and orbital dynamic nonlinearities were raised, no solutions were offered beyond convergence to stability through successive feedback controlled thruster pulses.

U.S. Pat. No. 4,288,051 issued Sep. 8, 1991 to Goshcel entitled, "Method and Apparatus For Controlling A Satellite", relates to the stabilizing of a satellite relative to the three major axes prior to the point in time when the satellite is to change orbits, whereupon the engine system for reaching the new orbit is switched on. No separate nutation-damping scheme is disclosed.

U.S. Pat. No. 4,537,375 issued Aug. 27, 1985 to Chan entitled, "Method and Apparatus For Thruster Transient Control" describes a method of pre-biasing individual thruster motors to compensate for motor offsets and mismatches. The damping of nutational motion is not addressed.

U.S. Pat. No. 4,725,024 issued Feb. 16, 1998 to Vorlicek entitled "Method For Spinning Up A Three-Axis Controlled Spacecraft" describes a method for spinning-up a satellite about its roll axis prior to firing a motor. Nutational motion compensation is not described.

U.S. Pat. No. 4,758,957 issued Jul. 19, 1988 to Hubert et al., entitled "Spacecraft Stabilizing System And Method" discloses a method for simultaneously processing and nutation-damping a spinning spacecraft that includes thruster firing in response to feedback from angular momentum gyros. This patent has no disclosure of the subject three-pulse thruster firing scheme, nor does it address the topic of thruster compensation.

U.S. Pat. No. 3,866,025 issued Feb. 11, 1975 to Cavanaugh entitled "Spacecraft Attitude Control System", discloses a spacecraft attitude control system for producing thruster firings which align the total angular momentum vector with the desired orbit normal vector while simultaneously adjusting orbit. The invention employs a commonly-available sensor and thruster system. However, it seeks to perform an orbit adjustment maneuver in a manner that is intended to minimize build-up of nutation during the maneuver, rather than provide a mechanism for correction following the maneuver. The control system computes angular rates rather than directly sensing the rate. In addition, the patent is silent about the specific transition attitude control techniques of the present invention.

Other patents uncovered which contain additional information on the general topics of nutation, attenuation, correction in spacecraft systems and the like are as follows:

| U.S. Pat. No. | Inventor |
| --- | --- |
| 3,624,367 | Hamilton, et al. |
| 3,643,897 | Johnson, Jr. |
| 3,937,423 | Johansen |
| 3,944,172 | Becker |
| 3,984,071 | Fleming |
| 3,997,137 | Phillips |
| 4,023,752 | Pistiner, et al. |
| 4,174,819 | Bruederle, et al. |
| 4,370,716 | Armieux |
| 4,386,750 | Hoffman |
| 4,521,855 | Lehner, et al. |

SUMMARY OF THE INVENTION

One of the tasks in a spacecraft having an attitude control system is control of the transition from a thruster control mode, such as that used for station-keeping maneuvers, with its relatively high angular rates, to an on-orbit control mode using, for example, a momentum wheel. The transition from the station-keeping mode to on-orbit mode must be performed carefully to avoid saturation and possibly loss of attitude control in the on-orbit control mode, since the high angular on-orbit rates prior to transition can cause large nutation.

The typical uncorrected attitude error following a station keeping maneuver is a nutation circle. To achieve a stable on-orbit mode, nutation amplitude must be sharply reduced, and preferably reduced to zero, before control is passed to the momentum-wheel-based on-orbit controller.

In accordance with the present invention, a method and apparatus is provided for substantially eliminating nutation in a three-axis stabilized spacecraft employing internal momentum wheels as an attitude stabilizer wherein nutation damping is effected using a closed loop control system in which the momentum wheels work in conjunction with spacecraft thrusters.

A new and improved method and apparatus is provided for transitioning a satellite from a wide bandwidth large thruster torque controlled station-keeping mode to a low bandwidth on-orbit mode in which satellite pointing is controlled by a torque limited momentum wheels.

The method and apparatus first detects initial conditions for an optimal transitioning and then utilizes rapid thruster pulsings to reduce satellite rates to a value which is within the capture ability of the torque limited momentum wheels. Thruster compensation technique are also utilized to normalize the thruster torques for accurate satellite rate reduction. The result of this new technique is a reduction of pointing error present in the previous conventional method.

DESCRIPTION OF AN EMBODIMENT OF THE INVENTION

Figure 1:
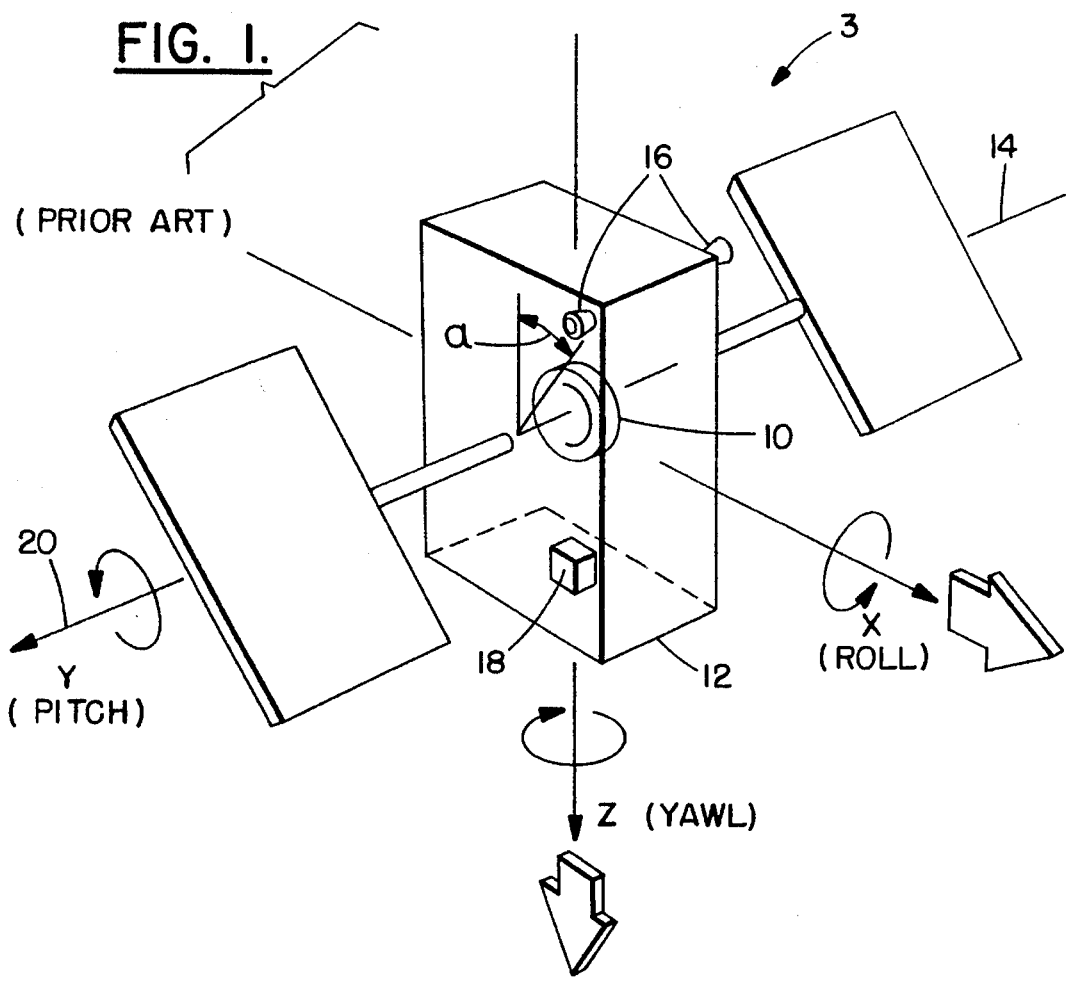
FIG. 1 is a schematic representation of a prior art satellite orbiting in a three-dimensional vector space.

FIG. 1 illustrates a conventional orbiting satellite 8. Under normal on-orbit operation, attitude control is maintained through one or more spinning momentum wheels 10. Each momentum wheel 10 is rigidly attached to frame 12 of the satellite 8 and provides inertial stability, represented by a perpendicular momentum vector 14, which in the example shown in FIG. 1, points along the -Y direction. Small changes in satellite 8 orientation can be effected by changing the speed of one or more momentum wheels 10 and thereby redirecting momentum vector 14.

Periodically, satellite 8 is commanded into a station-keeping mode in order to adjust the orbit or trajectory of operation. This station-keeping mode is implemented using one or more thrusters 16 which fire for a set duration to adjust the orbit or satellite 8. A byproduct of the station-keeping mode is the introduction of various attitudinal perturbations produced by the thruster 16 forces. Among these disturbances is the tendency of satellite 8 to develop a nutational motion about its pitch or Y-axis 20. This nutational motion can be understood by imagining the application of a momentary perpendicular force to the rotational axis of a spinning top or gyroscope. The perpendicular force will cause the top to begin to nutate around the axis of its new momentum vector. The satellite's nutation prevents momentum wheel 10 from controlling the attitude, since the momentum of the nutation greatly exceeds the momentum capability of control wheel 10.

Figure 2:
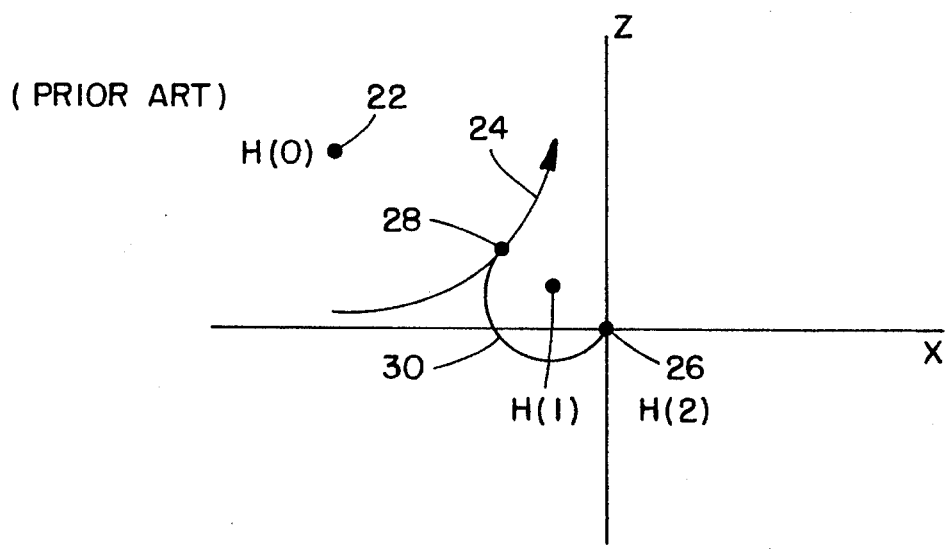
FIG. 2 is a diagram showing the prior art damping of the momentum vector in the X-Z plane by deadbeat impulse firing of a three-axis stabilized satellite.

The goal of the transition mode correction sequence is to utilize short pulses of thruster 16 creating impulses to stop the nutation and to orient momentum vector 14 in a desired direction, such that attitudinal control by momentum wheel 10 can be resumed. FIG. 2 shows a graphical representation of this transition mode, where H(O) represents the initial center 22 of the tip of momentum vector 14 in the X-Z plane nutating along an initial circular nutation path 24. From the example above, this graph can also be thought of as representing the view looking down on the nutating gyroscopic momentum wheel along the momentum axis as momentum vector 14 traces the path of nutation. The spacecraft origin 26, formed by the intersection of the X (roll) and Z (yaw) axes including biases if desired, represents the desired momentum vector 14 position which, when achieved, will enable momentum wheel 10 to control spacecraft 8 stability during on-orbit mode operation.

The prior art teaches that in the ideal system, deadbeat nutation damping permits the initial center of momentum 22 to be moved to origin 26 in two pulses of thrusters 16 from any arbitrary initial condition. The first pulse is triggered as the spacecraft 8 nutates to point 28. This first firing creates a nutational trajectory 30 of momentum vector 14 which will cross the origin 26. At the point of intersection of the X and Z axes, thrusters 16 are fired a second time to stop momentum vector 14 at origin 26. At this point, according to the prior art, the nutational component should be eliminated and momentum vector 14 will be controllable by the momentum wheels 16.

The U.S. Pat. No. 4,931,942 issued to Garg et al. and discussed herein above teaches additional firings near the origin 26 to compensate for non-idealities which may prevent exact intersection with origin 26.

The U.S. Pat. No. 5,222,023 issued to Liu et al. and discussed hereinabove teaches the use of a compensated thruster control system as well as a modified deadbeat sequence to more accurately and efficiently shift the momentum vector from its initial position to its desired direction in three thruster firings. Referring to FIG. 2, the damping of the momentum vector used in the Liu et al. patent is illustrated. In the Liu et al. patent the method includes the firing of a first thruster pulse at point 17 to linearize the motion of the spacecraft, the computing of the direction 20 and duration of a second thruster pulse firing, a short waiting period to allow a momentum error to reach steady state, the firing of a second thruster pulse in order to nutate the spacecraft to the origin point 11 of the desired on-orbit operation, another wait of one-half of a nutation period while the spacecraft nutates to the origin and then firing a third thruster pulse to stop the nutation when the spacecraft reaches the origin.

The present invention provides an improvement over the prior art methods in that rapid thruster pulses are used with no deadbeating. Automatic entry logic and rate averaging is used. Variable thruster compensation is employed and the rates on three axes are damped.

Figure 3:
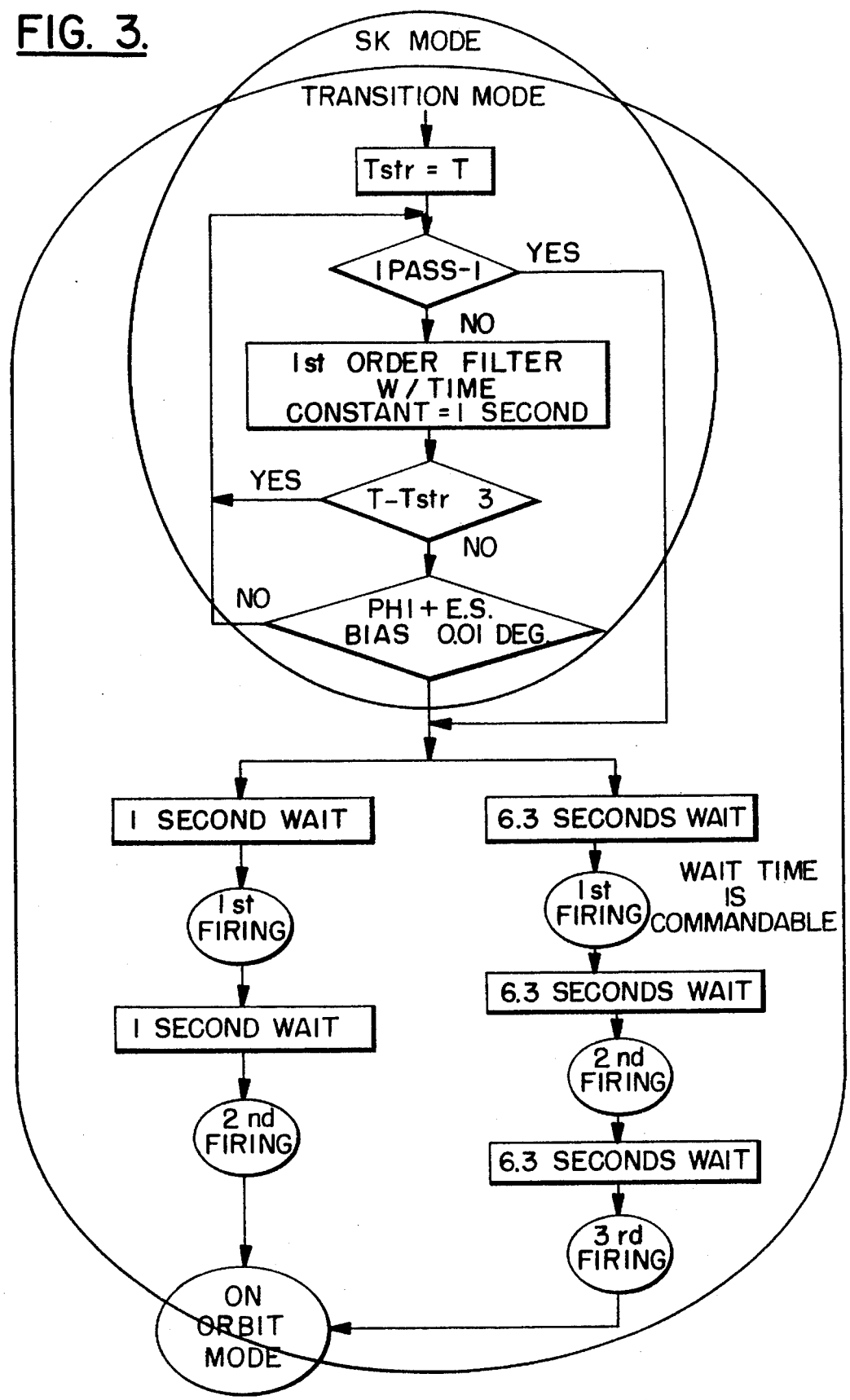
FIG. 3 is a flow diagram showing the transition loop events sequence steps of the present invention.

Referring to FIG. 3, a flow chart for the method of the present invention is illustrated. FIG. 3 shows a time sequenced flow chart of the transition process of the present invention. The spacecraft illustrated in FIG. 1 is initially in a thrusters torque controlled station keeping mode 34 and then enters into a transition mode 36, in which nutational motion is damped and stopped.

The large ellipses shown enclosing the method steps in FIG. 3 illustrate the overlap of the different spacecraft control modes. This is different from the Liu et al. U.S. Pat. No. 5,222,023 and other prior art where no overlapping of control modes occurred. The Transition mode allows the spacecraft to change state from a high-bandwidth, high-torque stationkeeping mode (SK mode) to a low bandwidth, low torque on-orbit mode. The flowchart in FIG. 3 shows a large ellipse at the top of the figure labelled "SK mode" which signifies that this part of the method is executed while the spacecraft is in stationkeeping mode. This upper ellipse is overlapped with a large ellipse in the center of the page labelled "Transition mode". This is because the spacecraft operator can command Transition mode and have the spacecraft control remain in Stationkeeping mode until the roll error entry logic test ("PHI+ES bias <0.01 deg") is satisfied. Only at that point does the SK mode control end, and the spacecraft control is then completely in Transition mode. The Transition mode ellipse is overlapped with the small ellipse at the bottom of FIG. 3 labelled "On-Orbit Mode" because the left hand sequence which regulates the pitch axis state will terminate and transfer control of the pitch axis to the on-orbit pitch momentum wheel controller several seconds before the right-hand sequence, which regulates the roll/yaw states, will terminate. Thus, for several seconds, one axis of the spacecraft if controlled by the on-orbit mode, and two axes of the spacecraft are controlled by the transition mode.

In transition mode, the first event is "Tstar=T" which initializes a counter to the time at which the Transition mode is commanded by the spacecraft operator. The next step is a test on "IPASS=1". This is a operator commanded flag which will bypass the roll error entry logic when set to IPASS=1. If the result of the IPASS=1 is "yes", the sequence process to point 40. If the result of the IPASS=1 is "no", the transition mode sequence proceeds to the "1st order filter w/time constant=1 second" event. This filter serves to remove high frequency noise from the spacecraft roll error measurement. The next event is "T-Tstr<3" which serves to allow the filter output 3 seconds to reach a steady state value before any tests are made on the spacecraft roll error. If the answer to "T-Tstr<3" is "yes", the sequence returns to point 38 because 3 seconds has not elapsed and the filter is still in a transient state; and the sequence is repeated until "t-Tstr<3" is "no". The next step is then "PHI+E. S. bias<0.01 deg", a test to compare the absolute value of the sum of the filtered roll error measurement plus any commanded Earth sensor bias value, to the threshold angle value of 0.01 degrees. If the result of "PHI+ES bias<0.01 deg" is "no", the sequence returns to point 38 and repeats, otherwise the sequence proceeds to point 40. This initial portion of the algorithm serves as an automatic entry logic which initiates transition mode only at the most favorable dynamic condition.

At point 40, two independent processes begin simultaneously. The process on the left-hand branch fires the spacecraft pitch axis thrusters to reduce the pitch axis rates and transition to the on-orbit pitch momentum wheel controller. The process on the right-hand branch fires the spacecraft roll and yaw thrusters to reduce the roll and yaw axis rates to allow transition to the on-orbit roll/yaw momentum wheel controller. Both sequences incorporate wait periods which serve to reduce the errors caused by spacecraft rates induced by the solar array flexible modes. The period of the solar array flexible modes are different for the pitch and the roll/yaw axes, so two separate wait periods are necessary. The magnitude of the waiting time is commandable by means of spacecraft operator command, based on measurements of the spacecraft solar array fundamental frequencies. The wait times shown in FIG. 3 are those predicted by analysis of the solar arrays.

In both sequences, following the wait period, the thrusters are fired to reduce the spacecraft rates, which results in the spacecraft approaching its desired on-orbit attitude state. The length of the thruster firings are calculated based on the measured spacecraft rates, and then corrected using a thruster compensation curve to allow for nonlinear performance of the thrusters for very small thruster firings. This is the same procedure as in the previous Liu et al. U.S. Pat. No. 5,222,023. Then again, in both sequences, after another wait period, a second firing of the thrusters takes place. In the 1.0 second wait sequence, the spacecraft pitch axis is now in its desired attitude state, and the pitch momentum wheel controller is engaged. A final wait period occurs in the right-hand sequence, followed by the third firing of the roll/yaw thrusters, after which the spacecraft roll and yaw states are at their desired value and the roll/yaw momentum wheel controller is engaged.

Figure 4:
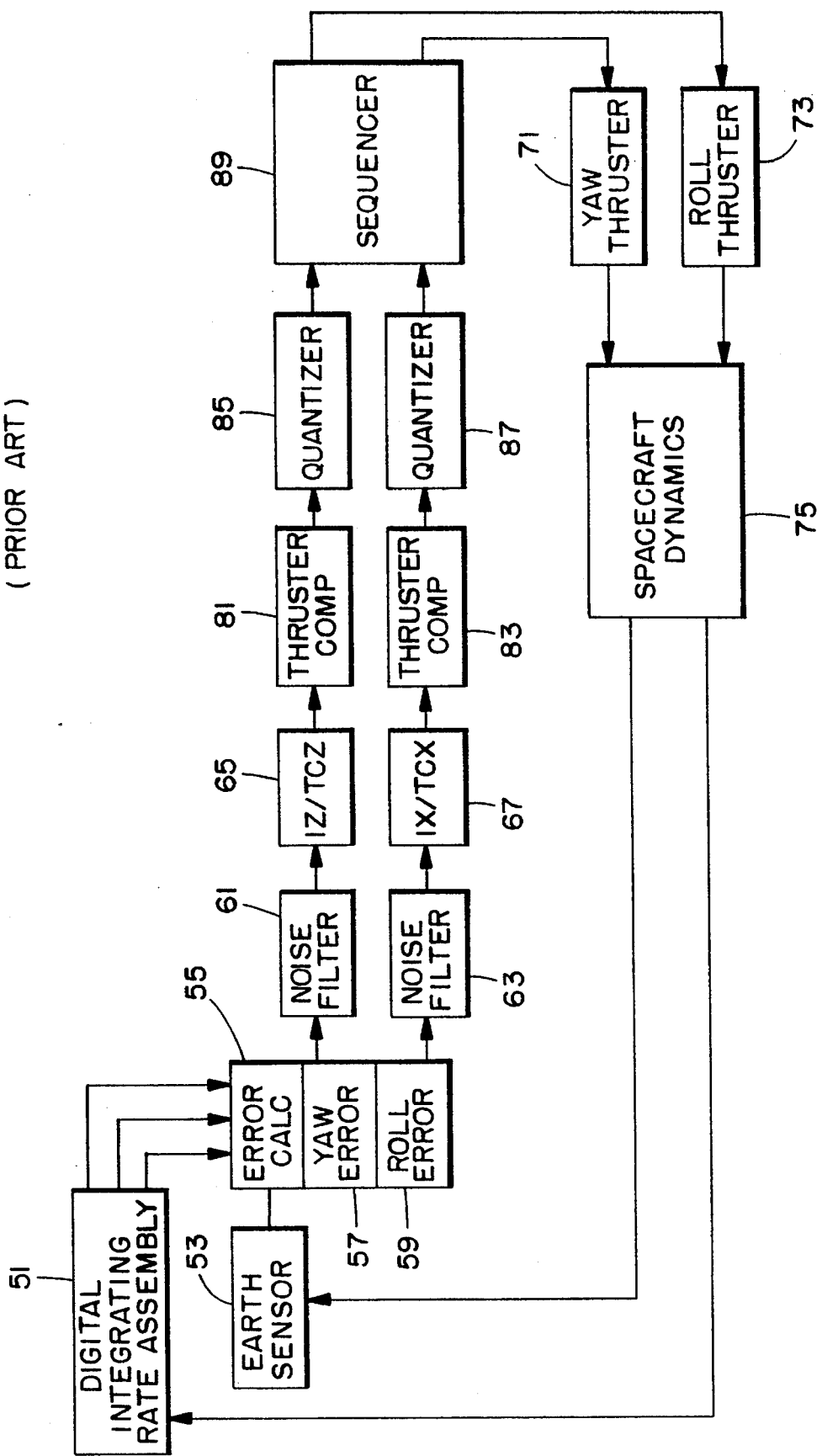
FIG. 4 is a prior art transition control system.

FIG. 4 shows a transition control system of the type described in FIGS. 5 and 6 of U.S. Pat. No. 5,222,023 issued to Liu et al. A transition control system according to the principles of FIG. 4 may also be used as the structure for carrying out the method of the present invention.

In FIG. 4, at the completion of the station-keeping maneuver, error calculator 55 receives information relating to roll/yaw rates and yaw position from Digital Integrating Rate Assembly (DIRA) 51 and information relating to spacecraft roll position from earth sensor 53. Error calculator 55 produces a pair of error coefficients which are ultimately used to determine thruster 5 pulse duration times for yaw and roll thrusters 71, 73 respectively. Error calculator 55 produces yaw momentum error 57 and roll momentum error 59 and transmits these coefficients to a pair of low pass noise filters 61, 63. The outputs of noise filters 61, 63 are multiplied by weighting factors 65, 67 consisting of inertia components (I) divided by torque components (T).

These are applied to thruster compensators 81, 83 wherein empirical information relating to the non-idealities of the averaged thruster's performance is applied to the error coefficients. These coefficients are quantized in blocks 85, 87, and these new error coefficients are implemented in a modified timing sequencer 89. This modified timing sequencer calculates and transmits firing durations in yaw and roll thrusters 71, 73, respectively. A feedback path is provided by way of spacecraft dynamics 75.

What has been described is an improved position control method for satellites and spacecraft wherein the transition from a high-bandwidth, high-torque stationkeeping (SK) mode to a low-bandwidth, low torque On-Orbit Mode is carried out. The transition from the thruster controlled stationkeeping mode to the momentum wheel controlled On-Orbit Mode uses a unique threshold entry method to automatically initiate the transition mode at the point with the most favorable dynamics. Also, the disclosed method eliminates the use of nutation in conjunction with a deadbeat thruster sequence to correct the spacecraft attitude to improve pointing performance and significantly shorten the time spent in the transition mode.

While the invention has been described in connection with a preferred embodiment, it is not intended to limit the scope of the invention to the particular form set forth, but, on the contrary, it is intended to cover such alternatives, modifications, and equivalence as may be included within the spirit and scope of the invention as defined in the appended claims.

We claim:

1. In a spacecraft having thruster and momentum wheel mechanisms including pitch and roll/yaw thrusters and pitch and roll/yaw momentum wheels for maintaining and changing the attitude position of the spacecraft, a method for effecting the transition from a first, stationkeeping mode position controlled by the thruster mechanism to a second, on orbit position controlled by the momentum wheel mechanism, comprising the steps of:

Step 1. In a wide bandwidth, large thruster torque stationkeeping mode for a spacecraft wherein the spacecraft is maintained in position by torque produced by the thruster mechanism, the step of initiating a transition mode while said spacecraft is simultaneously in said stationkeeping mode by initiating a counter, Step 2. While said spacecraft is simultaneously in said stationkeeping mode and said transition mode, performing transition mode steps of determining whether the measured roll error signal of the spacecraft is less than a given value, Step 3. In the event said measured roll error signal is less than said given value, performing the transition mode step of ending said stationkeeping mode and placing said spacecraft in a low bandwidth on-orbit mode by simultaneously carrying out a process to reduce spacecraft pitch axis thrusters to perform a transition to an on-orbit pitch momentum wheel controller and a process to reduce roll and yaw axes rates by firing spacecraft roll/yaw thrusters to permit transition to an on-orbit roll/yaw momentum wheel controller, said firings of said spacecraft pitch axis thrusters and said roll/yaw thrusters changing said attitude position of said spacecraft from said first stationkeeping position to said second, on-orbit position by immediate cancellation of said thruster controlled-torque of said stationkeeping mode to prevent rotation, and engaging said pitch momentum wheel and said roll/yaw momentum wheel to maintain said spacecraft in said second, on-orbit position.

2. A method according to claim 1 wherein said Step 2 includes carrying out transition mode process steps while said spacecraft is in said stationkeeping mode that, in the event that said measured roll error signal is not less than said given value, includes filtering said measured roll error signal to remove high frequency noise form said measured roll error signal, and after a predetermined delay, comparing said filtered measured roll error signal to a threshold angle signal to determine if said filtered measured roll angle signal is less than said threshold angle signal, wherein, in the event that said filtered measured roll error signal is not less than said threshold angle signal, said filtering and comparing steps are repeated.

3. A method according to claim 2 wherein in the event that said filtered measured roll angle signal is less than said threshold angle signal, then Step 3 is carried out.

4. A method according to claim 3 wherein, in Step 3, said process for reducing pitch axis rates includes a plurality of separate firings of said pitch axis thrusters separated by selected time delays to allow effective averaging of the pitch rate.

5. A method according to claim 3 wherein, in Step 3, said process to reduce roll and yaw axis rates includes a plurality of separate firings of said roll/yaw thrusters separated by selected time delays to allow effective averaging of the said roll and yaw rate.

* * * * *